E. H. SMITH.
ACETYLENE BLOWPIPE.
APPLICATION FILED JAN. 23, 1914.
1,136,491.
Patented Apr. 20, 1915.
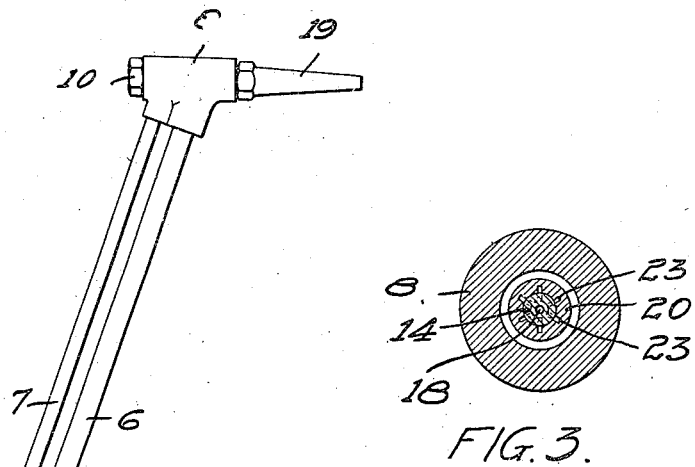
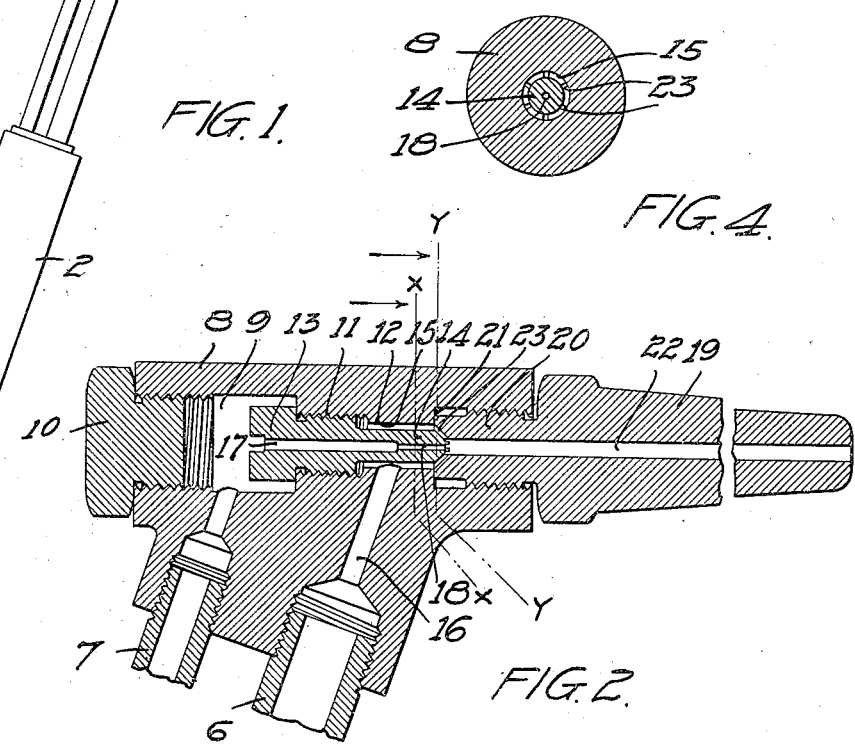
WITNESSES
INVENTOR
ELMER H. SMITH
BY
Paul Paul
ATTORNEYS

UNITED STATES PATENT OFFICE.

ELMER H. SMITH, OF MINNEAPOLIS, MINNESOTA.

ACETYLENE-BLOWPIPE.

1,136,491. Specification of Letters Patent. Patented Apr. 20, 1915.

Application filed January 23, 1914. Serial No. 813,907.

*To all whom it may concern:*

Be it known that I, ELMER H. SMITH, citizen of the United States, resident of Minneapolis, county of Hennepin, State of Minnesota, have invented certain new and useful Improvements in Acetylene-Blowpipes, of which the following is a specification.

My invention relates to blow pipes designed for use with acetylene flames for metal cutting and welding purposes and the object of the invention is to improve the construction of blow pipe in general use to the end that a more thorough and uniform mixture of gas and oxygen will take place and flareback of the flame in the burner will be positively prevented.

The invention consists generally in various constructions and combinations, all as hereinafter described and particularly pointed out in the claim.

In the accompanying drawings forming part of this specification, Figure 1 is a side view of a burner embodying my invention, Fig. 2 is a longitudinal sectional view through the burner head and tip, Fig. 3 is a transverse sectional view on the line y—y of Fig. 2, Fig. 4 is a similar view on the line x—x of Fig. 2.

In the drawing, 2 represents the handle of the blow pipe and 3 and 4 acetylene and oxygen tubes connected therewith and communicating with a source of acetylene gas and oxygen supply, not shown. At the opposite end of the handle 2 pipes 6 and 7 are provided, which communicate through the handle with the tubes 3 and 4 and on these pipes the burner proper is mounted.

8 represents the head of the burner, into which on one side the pipes 6 and 7 are tapped.

In one end of the head a chamber 9 is formed, provided with a removable plug 10 which allows access to the chamber. At the inner end of the chamber a socket is formed, consisting of an interiorly threaded outer portion 11 and a cylindrical inner portion 12, preferably of less diameter than the outer portion. A plug 13 has a part exteriorly threaded to engage the threaded walls of the socket and a nozzle 14 is formed in the inner end of the plug which projects into the inner portion 12 and is spaced from the walls thereof, forming an annular passage 15 around the nozzle. The pipe 6 communicates through a duct 16 with this passage and the pipe 7 with the chamber 9. The inner end of the nozzle 14 is preferably tapered, and the plug 13 has a central duct 17 formed therein, extending lengthwise thereof and terminating in a small duct or passage 18 which extends through to the end of the nozzle concentric with the duct 17. A tip 19 has a threaded nipple 20 formed on its inner end that is adapted to screw on to a socket in the head, the inner end of the tip 19 being seated against a shoulder 21 adjacent to the inner end of the nozzle 14. The tip 19 is provided with a central duct 22 and the inner portion of the nipple is countersunk to form a seat for the inner end of the nozzle 14, and said nipple is provided in its beveled end face with a series of ducts 23 which lead from the passage 15 to the duct 22 and allow the flow of gas from the passage 15 to be impinged against the stream of oxygen that is discharged centrally into the duct 22 from the nozzle 14.

I have found that by providing a series of comparatively fine ducts that the acetylene gas will flow with greater velocity from the annular passage 12 to mingle with the jet of oxygen from the central duct in the nozzle 14, and thereby a more complete and uniform mixture of the acetylene gas and oxygen will take place.

It will be understood that instead of having the narrow ducts in the counter-sunk surface of the tip, they may be formed in the tapered end of the nozzle. This, however, would be obviously a mere reversal in the construction of the device and I have not thought necessary to illustrate it herein.

I claim as my invention:

An acetylene blow pipe comprising a head having a socket and a chamber formed therein, a plug fitting into said socket and having a longitudinal duct therein communicating with said chamber and a nozzle projecting into said socket and spaced from the walls thereof and forming a passage around said nozzle, said nozzle also having a comparatively small duct forming a continuation of said first named duct, the inner end of said nozzle being tapered, a tip fitting within said head adjacent to said nozzle and provided with a longitudinal duct concentric with the duct in said nozzle, the inner end of said tip being countersunk and seated against the tapered end of said nozzle, the countersunk surface of said tip having a series of comparatively small ducts leading from the passage around said nozzle to the duct in said tip, whereby the velocity of the flow of gas from said passage into the jet of oxygen will be increased and a more complete and uniform mixture obtained.

In witness whereof, I have hereunto set my hand this 14th day of January 1914.

ELMER H. SMITH.

Witnesses:
GENEVIEVE E. SORENSEN,
EDWARD A. PAUL.